United States Patent
Dhadphale et al.

(10) Patent No.: US 12,025,528 B2
(45) Date of Patent: Jul. 2, 2024

(54) DEVICE AND METHOD TO PREDICT THE ONSET OF OSCILLATORY INSTABILITIES IN SYSTEMS WITH TURBULENT FLOW

(71) Applicants: INDIAN INSTITUTE OF TECHNOLOGY MADRAS, Chennai (IN); The Regents of the University of California, Oakland, CA (US)

(72) Inventors: Jayesh Dhadphale, Chennai (IN); Eustaquio Aguilar Ruiz, Desert Hot Springs, CA (US); Vishnu Rajasekharan Unni, Princeton, NJ (US); Abhishek Saha, San Diego, CA (US); Sujith Indusekharan Nair, Chennai (TN)

(73) Assignees: Indian Institute of Technology Madras (IIT Madras), Chennai (IN); The Regents of the University of California

( * ) Notice: Subject to any disclaimer, the term of this patent is extended or adjusted under 35 U.S.C. 154(b) by 262 days.

(21) Appl. No.: 17/377,918

(22) Filed: Jul. 16, 2021

(65) Prior Publication Data
US 2022/0018731 A1 Jan. 20, 2022

Related U.S. Application Data

(60) Provisional application No. 63/052,867, filed on Jul. 16, 2020.

(51) Int. Cl.
*G01M 10/00* (2006.01)
*G06N 3/02* (2006.01)

(52) U.S. Cl.
CPC .............. *G01M 10/00* (2013.01); *G06N 3/02* (2013.01)

(58) Field of Classification Search
CPC .......... G01M 10/00; G01M 9/08; G06N 3/02; G06N 3/045; G06N 3/08
See application file for complete search history.

(56) References Cited

U.S. PATENT DOCUMENTS

| 5,784,300 A | 7/1998 | Neumeier et al. |
| 2021/0132555 A1* | 5/2021 | Nair ..................... G05B 13/048 |

FOREIGN PATENT DOCUMENTS

WO  WO-2018198132 A1  11/2018

* cited by examiner

*Primary Examiner* — Manuel A Rivera Vargas
(74) *Attorney, Agent, or Firm* — Convergence Intellectual Property Law P.C; Jonathan Garfinkel (57) ABSTRACT

Disclosed are devices and methods of detecting and mitigating oscillatory instabilities in systems with turbulent flow, such as thermoacoustic, aeroacoustic or aeroelastic equipment. The system includes a sensor array for measuring one or more parameters of an operating equipment S, and an analysis and prediction unit. The analysis and prediction unit is configured to estimate a state tensor to identify a state of the equipment indicating stable operation or impending oscillatory instability. The system further includes an actuator array configured to implement a control action to promote stable operation of the equipment. Methods for robust prediction of the state of stability are also disclosed. A neural ordinary differential equation (ODE) method of predicting stability or instability is disclosed, involving forming a neural network that incorporates an equation characteristic of the operational state. The invention further discloses a hybrid convolutional neural network based prediction method for stability.

5 Claims, 8 Drawing Sheets

DEVICE AND METHOD TO PREDICT THE ONSET OF OSCILLATORY INSTABILITIES IN SYSTEMS WITH TURBULENT FLOW

CROSS-REFERENCES TO RELATED APPLICATIONS

This application claims priority to U.S. Provisional Patent Application No. 63/052,867 entitled A DEVICE AND METHOD TO PREDICT THE ONSET OF OSCILLATORY INSTABILITIES IN SYSTEMS WITH TURBULENT FLOW filed on Jul. 16, 2020.

FIELD OF THE INVENTION

The present invention is generally related to devices and methods for turbulent flow systems and in particular to devices and methods of predicting behavior thereof.

BACKGROUND AND DESCRIPTION OF RELATED ART

Systems that involve fluid flow often exhibit, high amplitude periodic oscillations resulting from undesirable positive feedback between oscillations in multiple subsystems. Examples include: thermoacoustic instability, aeroelastic instability, and aeroacoustic instability. In systems with confined combustion, thermoacoustic instability is caused by the feedback between the unsteady heat release rate and the acoustic field of the confinement. Oscillations in structures immersed in an unsteady flow can be coupled with the fluctuations in the flow resulting in a positive feedback that cause large amplitude limit cycle oscillations known as, aeroelastic instability. Oscillatory flow structures (such as vortices, shear layers) when in positive feedback with the acoustic field of a system, can cause aeroacoustic instability. Such oscillatory instabilities cause increased wear and tear, and even damage to the corresponding system.

Oscillatory instabilities are also common in structural elements suspended in fluid flows. Commonly known as aeroelastic instabilities, these instabilities are the result of a positive coupling among the elastic, inertial, and aerodynamic forces. These undesired and potentially catastrophic sustained oscillations of the structure are also known as aeroelastic flutter. Such instabilities affect elastic bodies such as airplanes, wind turbines, skyscrapers, and suspension bridges. Although the dynamics of these have been studied over a long time, prognosis and mitigation of these oscillations remain a serious challenge.

SUMMARY OF THE INVENTION

The present invention in its various embodiments discloses systems, devices and methods for predicting and mitigating oscillatory instabilities in turbulent flow equipment. In one embodiment, a system for predicting and controlling onset of oscillatory instability in a turbulent flow equipment, is disclosed. The system comprises a sensor array comprising at least one sensor of a piezoelectric pressure transducer, a microphone or a strain gauge to measure analog signals, an analog to digital converter for converting the analog signals to a digital signal an analyzing unit, and a learning and prediction unit. The analyzing unit may be configured to estimate a state tensor including multidimensional data from the digital signal, or to implement a control action to promote stable operation of the equipment. The learning and prediction unit may be configured for classifying and recognizing patterns present in multidimensional data to identify potential onset of an unstable operating state of the equipment.

In various embodiments, the system may further comprise an actuator array present on the equipment, the actuator array configured to implement the control action to promote a stable operating state of the equipment. In various embodiments, the equipment may be a thermoacoustic equipment, an aeroacoustic equipment or an aeroelastic equipment.

In some embodiments, the equipment may be a thermoacoustic or an aeroacoustic equipment, and the actuator array comprises one or more of cooling holes, staged fuel injectors, micro swirlers, water injectors, or dampers. In some embodiments, the equipment is an aeroelastic equipment, and the actuator array comprises counterweights, fins, micothrustors, flywheels or gyros.

In some embodiments, the invention discloses a method of predicting and mitigating occurrence of a potentially unstable operating state of an equipment. The method comprises measuring, by one or more sensors in a sensor array, a signal indicative of operating state of the equipment to obtain a measured signal, converting, by analog to digital converter the measured signal into a digital signal, estimating, by an analyzing unit, a state tensor from the digital signal, receiving the state tensor at a learning and prediction unit, the unit having a neural network prediction module with a dynamic model of the operating state of the equipment, calculating a stability parameter corresponding to the received state tensor using the dynamic model, updating the dynamic model with the state tensor, comparing the stability parameter against a threshold; and identifying an impending onset of instability in the operating state of the equipment.

In some embodiments, the method may further comprise sending the updated dynamic model to the analyzing unit, determining, by the analyzing unit an optimal path for control and control action to mitigate the impending stability, sending the control action to a control unit; and modifying, by the control unit via an actuator array, the operating state of the equipment to mitigate the impending instability.

In some embodiments, the neural network method is one of a neural ordinary differential equation (ODE) method, or a hybrid convolutional neural network method.

In various embodiments, the neural network is an ODE neural network and the method comprises in step a), constructing a neural network (NN) with at least 3 layers, that maps state variables p(t) of an operational state to a dynamic state variable z(t) and to its time derivative ż, wherein $\dot{z}=f(z,t,w)$. The next step b) involves defining the NN with nodes in each layer and specifying a corresponding activation function. Then in c) weighted inputs corresponding to time series data at times t are received. In the next step d), the sum of the weighted inputs at each node for initial time to, to a final time instance $t_1$ for the corresponding operational states to obtain a weight matrix are computed. In the next step e), the method involves computing a distance in the weight matrix defined as $d^{(i)}=|\overline{w}^{(i)}-w^{(r)}|$, wherein $\overline{w}^{(i)}$ is an averaged weight over a window of $n_w$ samples, $w^{(r)}$ is an average weight corresponding to an unstable state. In a final step f), a sum of the distances is computed and a parameter $\mu_1$ is obtained that varies inversely as the sum, to obtain a measure of stability of the operational state.

In some embodiments, in step d) the final state predicted by neural ODE, $z_p(t_1)$ is given by:

$$z_p(t_1)=\int_{t_0}^{t_1}(z(t),t,w)dt, \text{ wherein,}$$

an error in the prediction is given by:

$$J=(z(t_1)-z_p(t_1))^2.$$

In some embodiments, the method comprises, prior to step d), training the neural network using weights learned from a first sample data $w^{(1)}$ as initial guess to find weights for subsequent samples. Then the neural network is trained on the $i^{th}$ sample data to get corresponding weights of NN as $w^{(i)}$. Then, the weights are averaged over a window of $n_w$ samples, given by $$\overline{w}^{(i)} = \frac{1}{n_w} \sum_{j=(i-n_w+1)}^{j=i} w^{(j)}$$

In some embodiments, the neural network is a hybrid convolutional neural network (CNN). The method comprises providing an input adjacency matrix of nodes to construct the convolutional neural network and providing two or more convolutional layers in the CNN with corresponding activation functions. Then, constructing the hybrid network involves reconstructing a phase space corresponding to $P(t)_l$ corresponding to time series data segment of length l to obtain a recurrence plot (RP). In the next step, a recurrence matrix, $R_{ij}$ is obtained, defined as $R_{ij}=\|X_i-X_j\|$, where $X_i$ and $X_j$ represent state points of the operational state in reconstructed phase space at $i^{th}$ and $j^{th}$ instances in time. In the next step, RPs corresponding to stable and unstable operational states. Then, the convolutional neural network (CNN) is trained using the RPs for known stable and unstable states. The trained CNN is then used to assign probabilities to unknown time series data segment as to stability of the operational state $\mu_i$.

This and other aspects are described herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present invention in its various embodiments is directed to systems, devices and methods for predicting the onset of oscillatory instabilities in turbulent flow systems.

Figure 1:
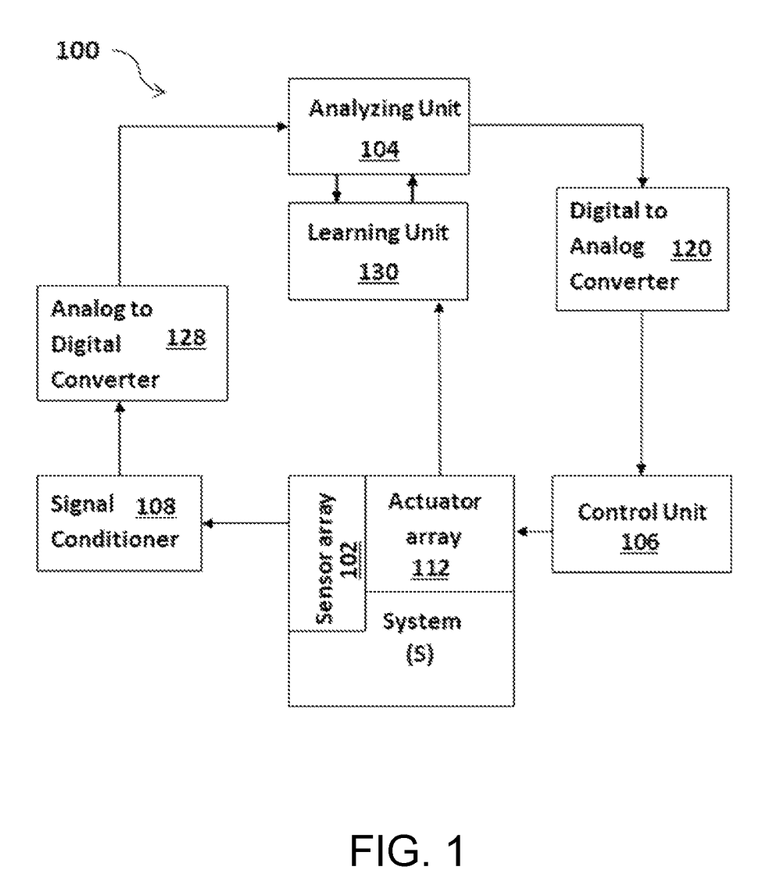
FIG. 1 shows schematic diagram of a system for predicting oscillatory instabilities in turbulent flow equipment according to embodiments of the invention.

One embodiment of a system for predicting oscillatory instabilities in turbulent flow equipment is illustrated with reference to FIG. 1. The system 100 comprises a sensor array 102 connected to an operating equipment S, wherein the sensor array is configured to measure one or more parameters of the system. In various embodiments, the operating unit S may be a thermoacoustic equipment, an aeroacoustic equipment or an aeroelastic equipment. The parameter may include pressure in some embodiments. In some embodiments, the sensor array 102 may comprise piezoelectric pressure transducers. In some embodiments the sensor array 102 may comprise a microphone. In some embodiments the sensor array 102 may comprise a strain gauge. The system further comprises a signal conditioner 108 for de-noising the signal before sending to an analog to digital converter 128 for converting the analog signals to machine-readable digital signal. The system includes an analyzing unit 104, configured to estimate a state tensor or matrix including multidimensional data from the digital signal.

The system in various embodiments includes a learning and prediction unit 130 configured for classifying and recognizing patterns present in multidimensional data to identify a state of the equipment. The state may, in some embodiments be characterized by one or more parameters indicating stability of the equipment S. In some embodiments, the parameters may either indicate stable operation or impending oscillatory instability. The system further includes an actuator array 112 configured to implement a control action to promote stable operation of the equipment S.

In various embodiments, the invention discloses methods of predicting and mitigating occurrence of a potentially unstable operating state of equipment. In one embodiment, a method 200 is disclosed with reference to FIG. 2A. The method comprises the steps of measuring in step 202, by one or more sensors in a sensor array, a signal indicative of operating state of the equipment. In a second step 204, the measured analog signal may be passed through a signal conditioner and converted, by analog to digital converter into a digital signal. In step 206, a state tensor may be estimated from the digital signal by the analyzing unit. In the next step 208, the state tensor is sent to a learning and prediction unit 130. The prediction unit 130 configured with a neural network prediction module then receives the state tensor. The neural network prediction module may constitute a dynamic model of the operating state of the equipment. On feeding the received state tensor, the prediction module may calculate in step 210, a stability parameter using the dynamic model. In some embodiments, the dynamic model may be updated (212) with the new state tensor data to improve the model.

Figure 2A:
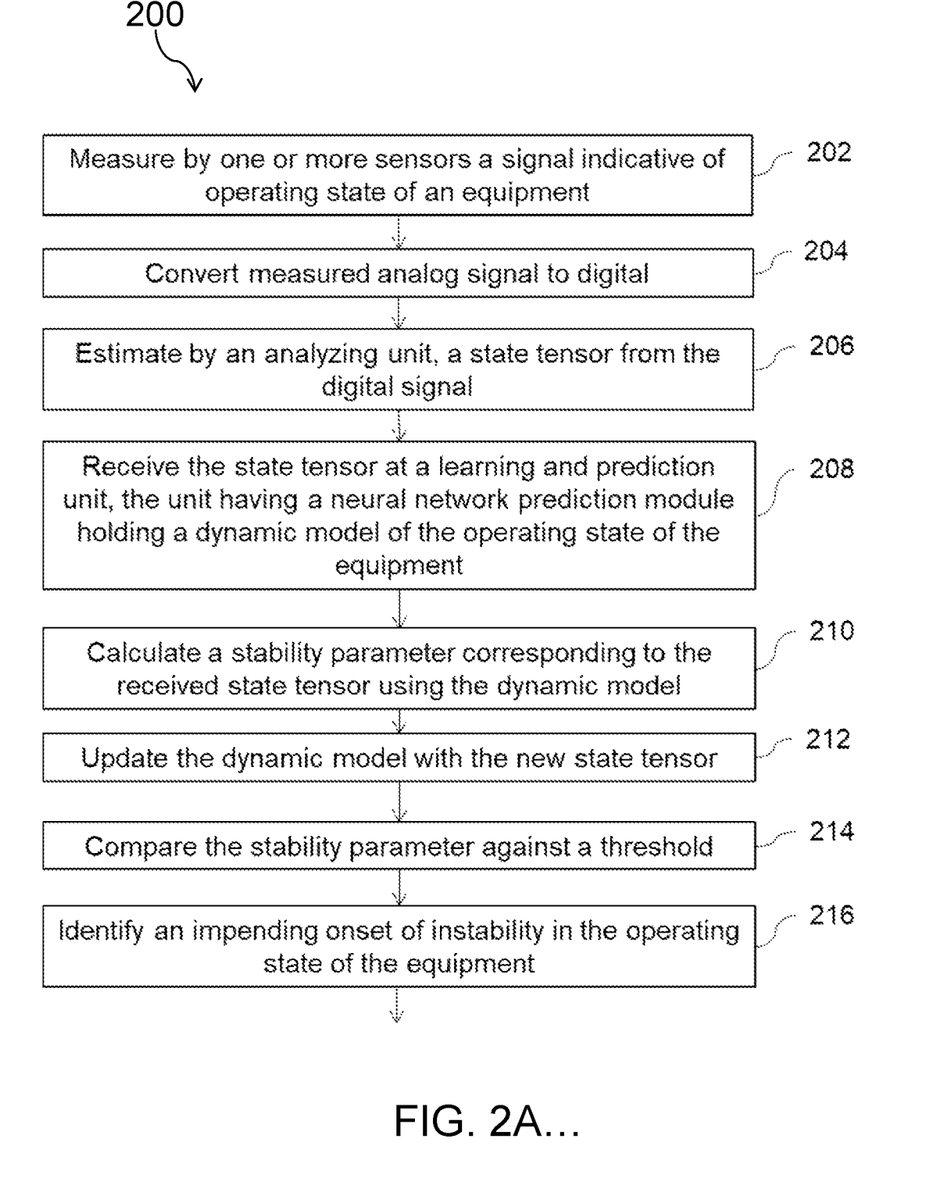
FIG. 2A illustrates a method of predicting and mitigating impending onset of instabilities in turbulent flow equipment.
Figure 2B:
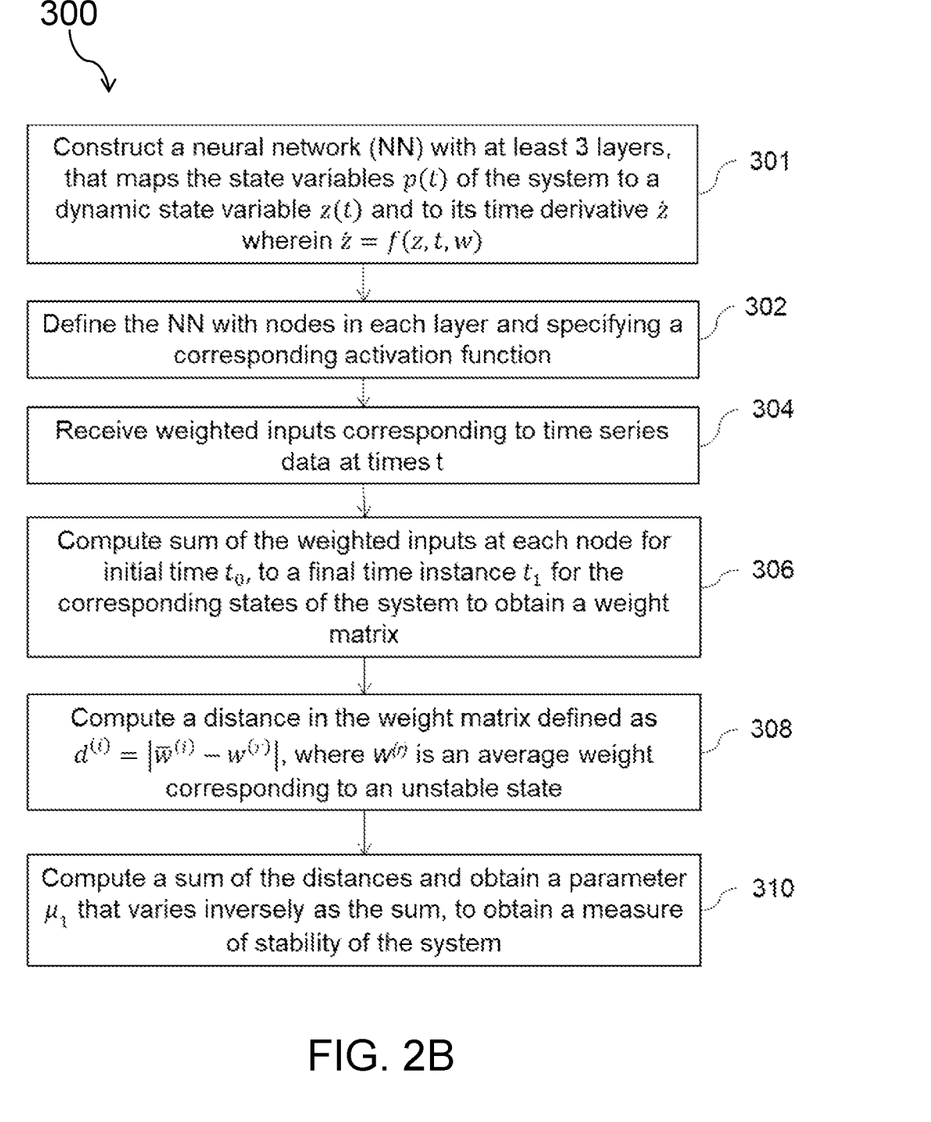
FIG. 2B illustrates steps in prediction using a neural ordinary differential equation (ODE) method.

In the next step, the method involves comparing the stability parameter 214 against a threshold to identify 216 likelihood of impending instability of the equipment. In various embodiments, the threshold is chosen appropriately according to permissible vibration levels, vibration amplitude or pressure fluctuations in the equipment. In some embodiments, the method 200 may further involve further steps to mitigate the instability, as illustrated in FIG. 2B. sending the updated dynamic model to the analyzing unit in step 218. The analyzing unit may then determine in step 220 an optimal path for control and the control action to mitigate the impending stability. The control action is then sent to the control unit by the analyzing unit in step 222. In the final step 224, the control action is implemented to modify the operating characteristics of the equipment. The modification in operating characteristics may move the equipment operating condition away from the impending instability, thereby avoiding damage to the equipment.

In some embodiments, the equipment is a thermoacoustic equipment or an aeroacoustic equipment and the actuator array 112 may comprise, cooling holes, staged fuel injectors, micro swirlers, water injectors or dampers. In some embodiments the dampers may comprise absorbent material fixed to the thermoacoustic equipment. The actuation may serve to move the resonance frequency away from the zone of instability. In some embodiments the equipment is an aeroacoustic equipment such as a wind turbine and the actuator array may comprise counterweights, fins, micothrustors, flying wheels or gyros. In some embodiments, the control action may involve modifying the resonance frequency of the equipment by actuating the counterweights, fins, microthrustors, flywheels or gyros. The actuator array 112 in some embodiments, may comprise a mechanical control of blade pitch. In some embodiments, the control action may involve modifying the blade pitch to reduce the instability. In some embodiments the equipment may be an aeroacoustic structure such as a bridge, or a high rise building, and the actuator array 112 may comprise counterweights. The control action may be to move the counterweights so that the resonance frequency is moved away from the frequency of operation.

In various embodiments, the method may involve using a neural ordinary differential equation (ODE) method to calculate one or more parameters characteristic of the instability. In alternate embodiments, the method may involve using a hybrid convolutional neural network (CNN) for learning and prediction.

In various embodiments, the neural ODE method or the hybrid CNN may involve a neural network comprising several layers of nodes. In some embodiments, the neural networks may comprise at least 3 layers.

In various embodiments, the neural networks may make use of either supervised or unsupervised learning, or both to improve the prediction module. In some embodiments, the initial training may be using a supervised data set, and thereafter the prediction module may be configured to improve using unsupervised data.

In various embodiments, the neural ODE method 300 is described further with reference to FIG. 2B. The learning in the neural ODE method is equivalent to that of identification from a measured time series data, p(t). The process involves constructing in step 301 a neural network (NN) with 3 or more layers, which maps the current dynamic state of the variable, z(t) derived from p(t), to its time derivative, ż. Here, the NN is equivalent to a matrix as in the state space representation which maps the state variables to their time derivative. The definition of the NN then involves in step 302, defining the nodes in each layer and specifying a corresponding activation function. In the next step 304, each node receives weighted inputs which are summed up and the activation function maps this sum to an output. The neural ordinary differential equation (ODE) is defined as, $$\dot{z} = f(z, t, w)$$

Here w is the weight matrix of NN. The next step 306 involves computing the sum of the weighted inputs at each node for initial time $t_0$ and to a time instance $t_1$ for the corresponding states of the system, to obtain a weight matrix. If $t_0$ is the initial time instance, $t_1$ is the final time instance, and the corresponding operational states of the equipment are $z(t_0)$ and $z(t_1)$, the final state predicted by neural ODE, $z_p(t_1)$ is, $$z_p(t_1) = \int_{t_0}^{t_1} f(z(t), t, w) dt$$

wherein the error in the prediction is given by, $$J = (z(t_1) - z_p(t_1))^2$$

The next step 308 involves computing a distance in the weight matrix defined as $d^{(i)} = |\overline{w}^{(i)} - w^{(r)}|$, where $w^{(r)}$ is an average weight corresponding to an unstable state. In a final step 310, the method involves computing a sum of the distances and obtain a parameter $\mu_1$ that characterizes stability of the system. The parameter $\mu_1$ may vary inversely as the sum, to obtain a measure of stability of the system.

In various embodiments, the method may further comprise training the neural network, prior to step 306. Let, the $i^{th}$ sample from experimental data correspond to z(t) from $t_i$ to $t_i + t_d$ duration. The neural ODE is trained on $i^{th}$ sample data to get corresponding weights of NN as $w^{(i)}$. The time separation between successive samples ($t_{i+1} - t_i$) is $t_s$ which is the stride size. The weights learned from the $1^{st}$ sample data i.e. $w^{(1)}$ is used as initial guess to find weights for subsequent samples. The weights are then averaged over a window of $n_w$ samples, wherein an average weight $\overline{w}^{(i)}$ is given by $$\overline{w}^{(i)} = \frac{1}{n_w} \sum_{j=(i-n_w+1)}^{j=i} w^{(j)}$$

The average weight corresponding to an unstable state ($w^{(r)}$) is used as reference to find the distance of an individual weight from it. The distance in the weight matrix is defined as, $$d^{(i)} = |\overline{w}^{(i)} - w^{(r)}|$$

The distance $d^{(i)}$ almost remains constant for stable operation with small amplitude aperiodic pressure oscillations and starts linearly increasing as the operational state approaches instability. Here the distance is configured as a measure of operational stability, $\mu_1$. In various embodiments, the distances corresponding to the weight matrix may be summed and $\mu_1$ computed as an inverse function of the summed distance. In various embodiments of the disclosed method, variation of the parameter $\mu_1$ approaching zero is used as a measure of the operational state approaching oscillatory instability.

Since the method 300 involves estimation of a Neural ODE characteristic of dynamic evolution of the operational state, the predictions of dynamic transitions upon variation of control parameters using the said method are expected to be more accurate than other methods of instability prediction. Thus the method 300 enables extrapolation or interpolation for operational states even in the control parameter space for which the prediction system was never trained. Thus, the neural ODE method may be trained using unknown data, or unsupervised learning.

Figure 2C:
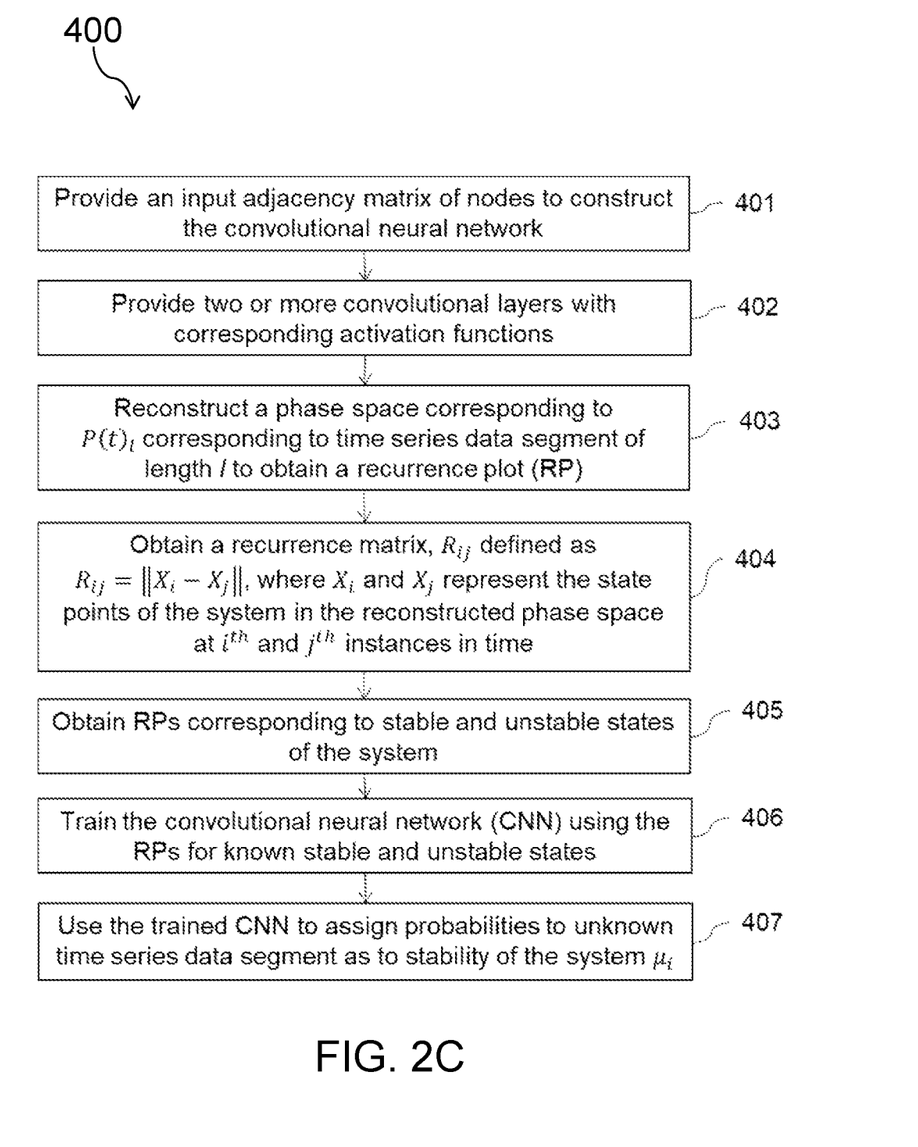
FIG. 2C illustrates steps of a hybrid convolutional neural network according to embodiments of the invention.

In various embodiments, a hybrid convolutional neural network method 400 is described with reference to FIG. 2C. The hybrid method uses a recurrence plot along with convolution for neural prediction. The method comprises the steps of providing an input adjacency matrix of nodes in step 401, and providing two or more convolutional layers with corresponding activation functions (402). The method then involves, constructing a recurrence plot (RP) from a time series segment, $P(t)_l$ of length l, corresponding to one of the state variables of the operational state. The pattern in the recurrence plot will vary according to the dynamics represented by $P(t)_l$. A recurrence plot is obtained in step 403 by first reconstructing the phase space corresponding to $P(t)_l$ following Takens' embedding theorem. In the next step, a recurrence matrix, $R_{ij}$ is obtained (404), where $R_{ij}=\|X_i-X_j\|$, where $X_i$ and $X_j$ represents the state points of the operational state in the reconstructed phase space at $i^{th}$ and $j^{th}$ instances in time. $\|\cdot\|$ is an appropriate norm in various embodiments. In one embodiment, it may be an $l^2$-norm. RPs are obtained as a plot representing $R_{ij}$. The method then involves in step 405 obtaining RPs corresponding to stable and unstable operational states. The unstable states may correspond to oscillatory instabilities, for example.

In the next step 406, RPs corresponding to stable state (aperiodic) and oscillatory instability (periodic) may be used to train the convolutional neural network to classify the operational state to stable and unstable conditions. The trained CNN, in turn, may be used (407) to assign probabilities for a time series segment of unknown stability state for it being an unstable state. These probabilities may be used as measures of stability of the operational state, $\mu_i$. Use of the hybrid CNN method disclosed with reference to FIG. 2C, provides the ability to detect patterns in the multidimensional data and thus represent dynamical transition in operational state as transitions in patterns identified using the hybrid CNN method.

The systems devices and methods disclosed here have several advantages as further set forth herein. The neural network methods disclosed are robust and are configured to provide a multidimensional self-learning data-driven model of the dynamic transitions in equipment operation that exhibits oscillatory instability. They enable identification of optimal control path for variation of control parameters to ensure safe approach to a stable operational state. The multidimensional self-learning data driven model of the dynamic transitions in operational state is constructed in terms of a linear or nonlinear combination of a set of precursors of the onset of oscillatory instability known as the state tensor. The state tensor is a function of control parameters and during operation of the equipment, an evolving multidimensional map of the state tensor is constructed. When the device detects an undesirable dynamic state or the proximity to an undesirable dynamic state by examining the state tensor, it identifies an optimal manifold in the parameter space through which the equipment may be maneuvered to approach a stable operational state. Thus, the devices and methodology described in the embodiments not only provide precursors to the onset of oscillatory instabilities but also identify an optimized control action to approach a stable state of operation.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope. Further, the examples to follow are not to be construed as limiting the scope of the invention which will be as delineated in the claims appended hereto.

EXAMPLES

Example 1: Neural ODE Method

The, thermoacoustic system was represented using the differential equation $$\frac{dX_{pq}(t)}{dt} = f(X_{pq}(t), t, \theta)$$

We used neural ODE to approximate this mapping of state vector to its time derivative. On training the neural ODE on time series of p' and q', we get a model for the thermoacoustic system. The absolute value of the difference between the predicted and the true time series is used as loss function. Optimization of the average loss function with q gives the parameter vector for the neural ODE. Since the neural ODE is trained on time series representing the simultaneous variation of p' and q', a NN with the optimum q can represent the coupled behavior of the unsteady heat release rate and acoustic perturbations in the thermoacoustic system.

Figure 3A:
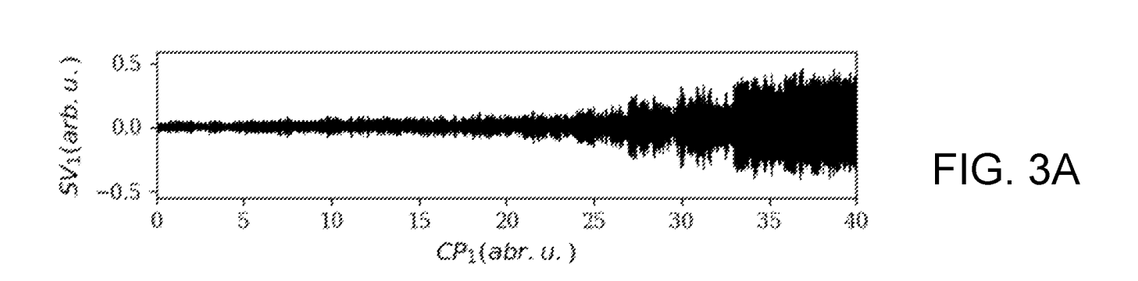
FIG. 3A shows the time series of a system variable, $SV_1$
Figure 3B:
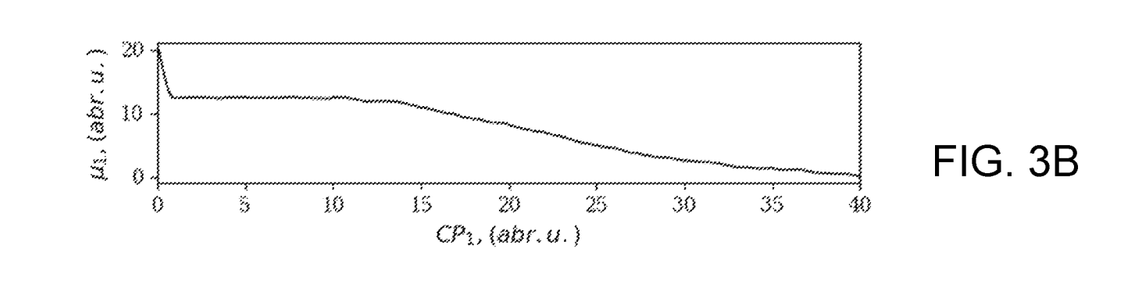
FIG. 3B shows corresponding stability measure $\mu_1$, which is the distance of weight matrix from $W^{(r)}$, that approaches zero as oscillatory instability is approached.
Figure 4A:
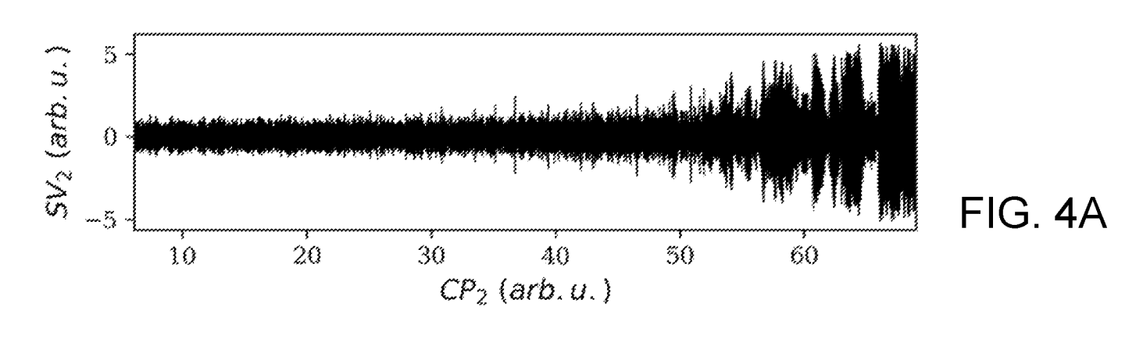
FIG. 4A shows time series of a system variable ($SV_2$) as a function of control parameter $CP_2$.
Figure 4B:
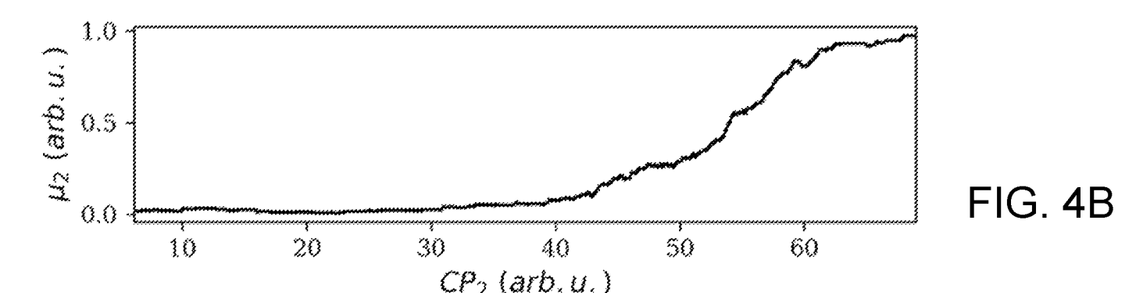
FIG. 4B shows the stability measure $\mu_2$ approaching 1 as the system transitions to oscillatory instability.
Figure 5A:
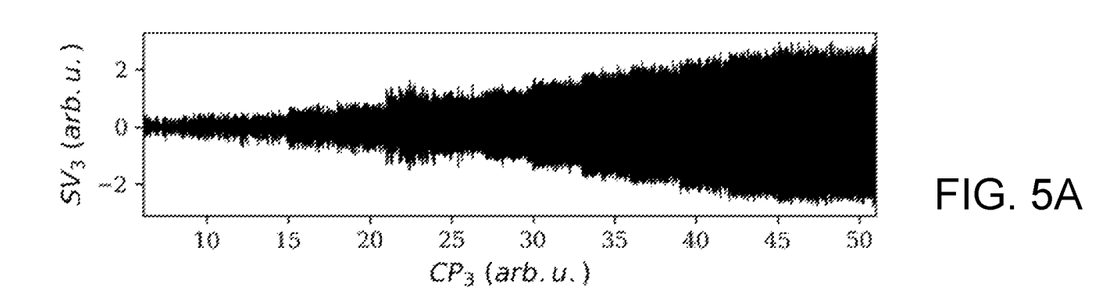
FIG. 5A shows system variable ($SV_3$) as a function of control parameter $CP_3$.
Figure 5B:
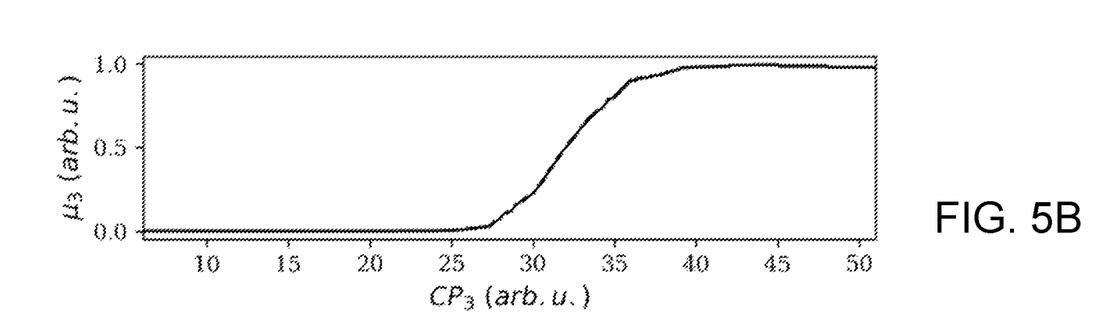
FIG. 5B shows that the stability measure $\mu_3$ approaches 1 as the system transitions to oscillatory instability.

The variation of a system parameter $SV_1$ with a parameter $CP_1$ of a combustor exhibiting thermoacoustic instability up on variation of $CP_1$ is shown in FIG. 3A. The corresponding variation of stability parameter $\mu_1$ is illustrated in FIG. 3B. $\mu_1$ approaching zero implies that the system is approaching oscillatory instability, and the progressive increase in amplitude of oscillation with decrease of $\mu_1$ is observed to lead up to the instability.

Example 2: Convolutional Neural Network Method

The complete structure of the CNN used in the present study is detailed in Table I.

TABLE I

Structure of the CNN

| Name | Dimensions | Operations |
|---|---|---|
| Input Adjacency Matrix | 122 × 122 | None |
| Conv-1 | 120 × 120 × 32 | 3 × 3 × 32 Convolution |
| Activation-1 | 120 × 120 × 32 | ReLU Activation |
| MaxPool-1 | 60 × 60 × 32 | 2 × 2 Max Pooling |
| Conv-2 | 58 × 58 × 32 | 3 × 3 × 32 Convolution |
| Activation-2 | 58 × 58 × 32 | ReLU Activation |
| MaxPool-2 | 20 × 20 × 32 | 2 × 2 Max Pooling |
| Flatten | 26912 | Converting to one column vector |
| FC-1 | 64 | 64 Fully-Connected |
| Activation-3 | 64 | ReLU Activation |
| FC-2 | 1 | 1 Fully-Connected |
| Activation-4 | 1 | Sigmoid Activation |

In FIG. 4A-4B and FIG. 5A-5B, we show the variation of dynamics of a system where up on variation of two different control parameters $CP_2$ and $CP_3$, as the systems approach oscillatory instability, the stability parameters $\mu_2$ and $\mu_3$ approach one.

What is claimed is:

1. A method of predicting and mitigating occurrence of a potentially unstable operating state of an equipment, the method comprising:

measuring, by one or more sensors in a sensor array, a signal indicative of operating state of the equipment to obtain a measured signal;

converting, by analog to digital converter the measured signal into a digital signal;

estimating, by an analyzing unit, a state tensor from the digital signal;

receiving the state tensor at a learning and prediction unit, the unit having a neural network prediction module with a dynamic model of the operating state of the equipment;

calculating a stability parameter corresponding to the received state tensor using the dynamic model;

updating the dynamic model with the state tensor;

comparing the stability parameter against a threshold; and identifying an impending onset of instability in the operating state of the equipment, wherein the neural network is an ODE neural network and the method comprises:

a) constructing a neural network (NN) with at least 3 layers, that maps state variables p(t) of an operational state to a dynamic state variable z(t) and to its time derivative $\dot{z}$, wherein $\dot{z}=f(z,t,w)$;

b) defining the NN with nodes in each layer and specifying a corresponding activation function;

c) receiving weighted inputs corresponding to time series data at times t;

d) computing a sum of the weighted inputs at each node for initial time $t_0$, to a final time instance $t_1$ for the corresponding operational states to obtain a weight matrix;

e) computing a distance in the weight matrix defined as $d^{(i)}=|\overline{w}^{(i)}-w^{(r)}|$, wherein $\overline{w}^{(i)}$ is an averaged weight over a window of $n_w$ samples, $w^{(r)}$ is an average weight corresponding to an unstable state; and f) computing a sum of distances corresponding to the weight matrix and obtaining a parameter $\mu_1$ that varies inversely as the sum, to obtain a measure of stability of the operational state; and comprising prior to step d), training the neural network using weights learned from a first sample data $w^{(1)}$ as initial guess to find weights for subsequent samples;

training the neural network on $i^{th}$ sample data to get corresponding weights of NN as $w^{(i)}$; and averaging the weights over a window of $n_w$ samples, wherein $$\overline{w}^{(i)} = \frac{1}{n_w} \sum_{j=(i-n_w+1)}^{j=i} w^{(j)}.$$

2. The method of claim 1, further comprising:
sending the updated dynamic model to the analyzing unit;
determining, by the analyzing unit a path for control and control action to mitigate the impending stability;
sending the control action to a control unit; and
modifying, by the control unit via an actuator array, the operating state of the equipment to mitigate the impending instability.

3. The method of claim 1, wherein in step d) the final state predicted by neural ODE, $z_p(t_1)$ is given by:

$z_p(t_1)=\int_{t_0}^{t_1} f(z(t),t,w)dt$, wherein, an error in the prediction is given by:

$J=(z(t_1)-z_p(t_1))^2$; and wherein $t_1$ is a final time instance.

4. A method of predicting and mitigating occurrence of a potentially unstable operating state of an equipment, the method comprising:

measuring, by one or more sensors in a sensor array, a signal indicative of operating state of the equipment to obtain a measured signal;

converting, by analog to digital converter the measured signal into a digital signal;

estimating, by an analyzing unit, a state tensor from the digital signal;

receiving the state tensor at a learning and prediction unit, the unit having a neural network prediction module with a dynamic model of the operating state of the equipment;

calculating a stability parameter corresponding to the received state tensor using the dynamic model;

updating the dynamic model with the state tensor;

comparing the stability parameter against a threshold; and identifying an impending onset of instability in the operating state of the equipment;

wherein the neural network is a hybrid convolutional neural network (CNN) and the method comprises:

providing an input adjacency matrix of nodes to construct the convolutional neural network;

providing two or more convolutional layers in the CNN with corresponding activation functions;

reconstructing a phase space corresponding to P(t), corresponding to time series data segment of length l to obtain a recurrence plot (RP);

obtaining a recurrence matrix, $R_{ij}$ defined as $R_{ij}=\|X_i-X_j\|$, where $X_i$ and $X_j$ represent state points of the operational state in reconstructed phase space at $i^{th}$ and $j^{th}$ instances in time;

obtaining RPs corresponding to stable and unstable operational states;

training the convolutional neural network (CNN) using the RPs for known stable and unstable states; and using the trained CNN to assign probabilities to unknown time series data segment as to stability of the operational state $\mu_i$.

5. The method of claim 4, further comprising:
sending the updated dynamic model to the analyzing unit;
determining, by the analyzing unit an optimal path for control and control action to mitigate the impending stability;
sending the control action to a control unit; and
modifying, by the control unit via an actuator array, the operating state of the equipment to mitigate the impending instability.

* * * * *